United States Patent [19]

Larsen et al.

[11] Patent Number: 5,255,472
[45] Date of Patent: Oct. 26, 1993

[54] TRIM LIP FOR A WEATHER SEAL

[75] Inventors: Douglas C. Larsen, Milford; Robert A. Vaughan, Dearborn, both of Mich.

[73] Assignee: The Standard Products Company, Cleveland, Ohio

[21] Appl. No.: 873,883

[22] Filed: Apr. 24, 1992

Related U.S. Application Data

[63] Continuation of Ser. No. 495,482, Mar. 19, 1990, abandoned.

[51] Int. Cl.$^5$ ............................................. F06B 7/16
[52] U.S. Cl. ............................................. 49/490.1
[58] Field of Search ................ 49/489, 490, 495, 497

[56] References Cited

U.S. PATENT DOCUMENTS

| | | | |
|---|---|---|---|
| 3,029,481 | 4/1962 | Henniges | 49/495 |
| 3,638,359 | 2/1972 | Kruschwitz | 49/490 |
| 3,959,941 | 6/1976 | Smith . | |
| 4,030,245 | 6/1977 | Yeomans . | |
| 4,119,325 | 10/1978 | Oakley et al. . | |
| 4,232,081 | 11/1980 | Pullan | 49/490 X |
| 4,349,994 | 9/1982 | Maekawa . | |
| 4,358,917 | 11/1982 | Oda et al. . | |
| 4,614,061 | 9/1986 | Brocke | 49/495 X |
| 4,614,347 | 9/1986 | Kruschwitz . | |
| 4,683,694 | 8/1987 | Ziegler . | |
| 4,701,376 | 10/1987 | Hermann et al. | 49/490 X |
| 4,884,370 | 12/1989 | Nozaki et al. | 49/490 X |
| 4,918,867 | 4/1990 | Hayashi et al. | 49/490 |

FOREIGN PATENT DOCUMENTS

| | | |
|---|---|---|
| 0155642 | 5/1987 | European Pat. Off. . |
| 0254635 | 1/1988 | European Pat. Off. . |
| 942330 | 11/1963 | United Kingdom ................. 49/490 |
| 1111284 | 4/1968 | United Kingdom . |
| 1338797 | 11/1973 | United Kingdom . |
| 1357006 | 6/1974 | United Kingdom ................. 49/497 |
| 2153421A | 8/1985 | United Kingdom . |
| 2193242 | 2/1988 | United Kingdom ................. 49/490 |

Primary Examiner—Peter M. Cuomo
Assistant Examiner—Michael Milano
Attorney, Agent, or Firm—Harness, Dickey & Pierce

[57] ABSTRACT

The present invention is a weather seal adapted to be secured on a flange of a vehicle to seal a gap between the flange and a panel member. The weather seal includes retaining members for retaining the weather seal on the flange and a separate trim lip for sealing the gap between the flange and panel member. The weather seal also includes an attachment portion receiving one end of the trim lip to removably secure the trim lip to the weather seal and allow accurate positioning of the trim lip to seal the gap when the weather seal is secured to the flange.

2 Claims, 1 Drawing Sheet

TRIM LIP FOR A WEATHER SEAL

This is a continuation of U.S. patent application Ser. No. 495,482, filed Mar. 19, 1990, now abandoned.

BACKGROUND OF THE INVENTION

1. Field of the Invention

The present invention relates generally to weather seals, and more particularly to, a weather seal for a door on an automotive vehicle.

2. Description of Related Art

Typically, a weather seal is used on a flange surrounding a door opening to conceal or close a gap between a panel member such as a trim panel and a flange of the door opening on an automotive vehicle. Generally, the weather seal has a U-shaped core member having an outer skin surrounding the interior and exterior of the core member. The outer skin has inwardly projecting retaining members extending within a channel defined by the core member which are adapted to grip or couple with the flange of the door opening to retain the weather seal to the flange. A trim lip or, in some cases, a sealing lip integrally molded with the outer skin extends outwardly from one side of the exterior of the outer skin. Additionally, a tubular member may extend outwardly from the other side of the exterior of the outer skin to form a seal with the door.

One disadvantage of the above weather seal is that the trim lip may become disposed in the gap between the flange and trim panel. This may occur when the weather seal is installed after the trim panel is in place on the vehicle or when the weather seal is installed on the flange and the trim panel is subsequently installed on the vehicle. As a result, additional time and monies may be expended to manually remove the trim lip from the gap and reposition the trim lip to cover the gap and contact the trim panel. Another disadvantage is that if the trim lip is not repositioned, an unpleasing aesthetic appearance results.

SUMMARY OF THE INVENTION

It is, therefore, one object of the present invention to provide a means for attaching a separate trim lip to the weather seal after the weather seal has been installed on a flange.

It is another object of the present invention to provide a removable trim or sealing lip for a weather seal.

It is yet another object of the present invention to provide a more aesthetically pleasing appearance by minimizing trim lip wrinkling around small radius corners. This is prone to occur in one piece constructions.

To achieve the foregoing objects, the present invention is a weather seal adapted to be secured on a flange of a vehicle to seal a gap between the flange and a panel member. The weather seal includes means forming a separate trim lip to the weather seal for sealing the gap between the flange and panel member. The weather seal also includes means for attaching the trim lip to the weather seal to seal the gap after the weather seal has been installed on the flange.

One advantage of the present invention is that the trim lip is a separate member which can be attached to the weather seal for accurate positioning of the trim lip to the desired position to cover or seal the gap. Another advantage of the present invention is that the trim lip is detachably or removably secured to the weather seal to allow for removal and repositioning of the trim lip. A further advantage of the present invention is that the separate trim lip requires less time and money expended to accurately position the trim lip. A still further advantage is that the present invention provides a more aesthetically pleasing appearance by minimizing trim lip wrinkling around small radius corners.

Other advantages, features and objects of the present invention will be readily appreciated as the same becomes better understood after reading the following description in light of the accompanying drawings.

DESCRIPTION OF THE PREFERRED EMBODIMENT

Figure 1:
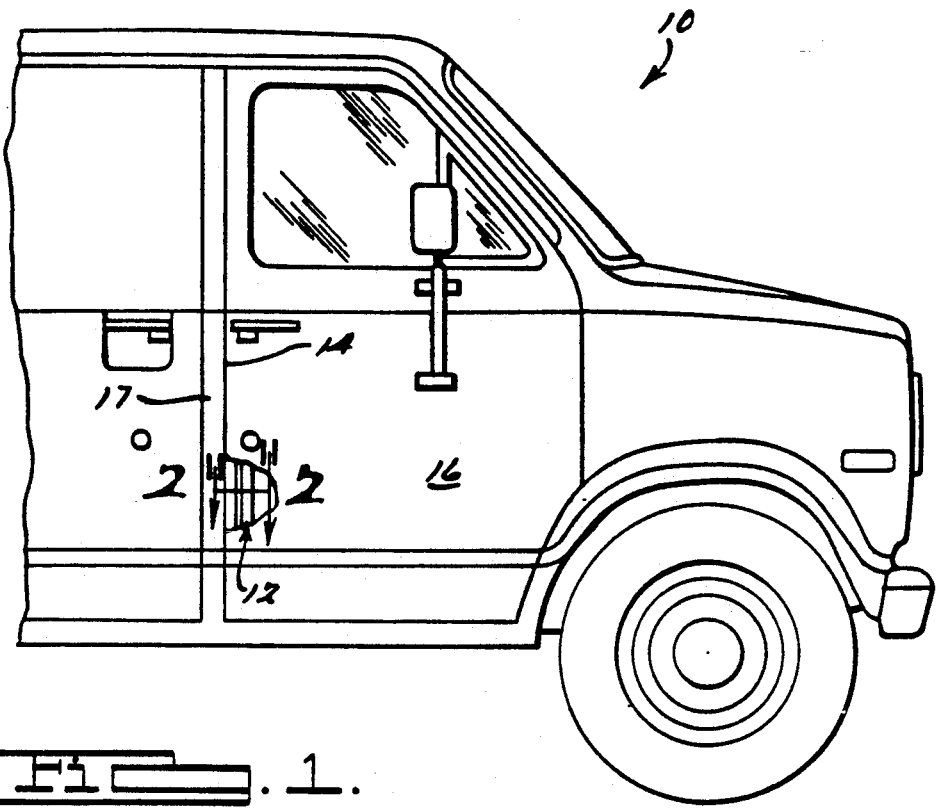
FIG. 1 is a partial side view of an automotive vehicle including a weather seal according to the present invention.
Figure 2:
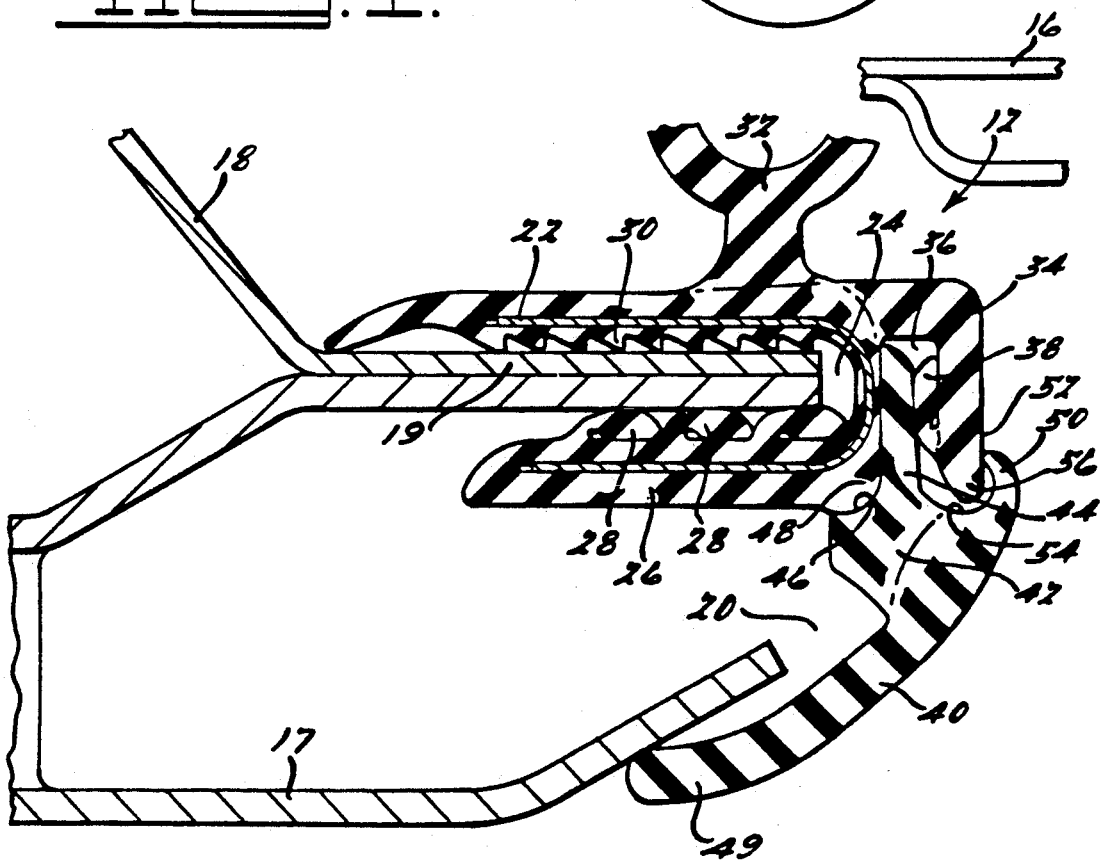
FIG. 2 is a sectional view taken along line 2—2 of FIG. 1.

Referring to FIG. 1, an automotive vehicle 10 is shown with a weather seal, according to the present invention, generally illustrated at 12. The vehicle 10 includes a door opening 14 to contain a door 16. The vehicle 10 also includes an inner panel member 17 such as an inner trim panel and an outer panel member 18 disposed adjacent the door opening 14. Referring to FIG. 2, the inner panel member 17 and outer panel member 18 form or define a flange 19 peripherally extending into the door opening 14. A gap 20 is disposed between the flange 19 and the inner panel member 17. The weather seal 12 couples with or grips the flange 19 to close or seal the gap 20 and conceal the gap 20 from view.

The weather seal 12 includes a core member 22 formed to a generally U-shape configuration to define a channel 24. The core member 22 is made of a metallic material. The weather seal 12 also includes an outer skin 26 surrounding the interior and exterior of the core member 22. The outer skin 26 is extruded from a soft polymeric material such as EPDM or PVC having a shore hardness of 65A. A plurality of retaining members 28 and 30 extend from the outer skin 26 and inwardly into the channel 24. The retaining members 28 and 30 grip or couple with the flange 19 to retain the weather seal 12 onto the flange 19. A tubular member 32 made of a sponge material may extend outwardly from the other side of the outer skin 26 to contact or sealingly engage the door 16. It should be appreciated that up to this point in the description the weather seal is conventional in construction.

The weather seal 12 includes an attachment portion 34 extending from the outer skin 26 at one side of the U-shaped end and extending across the width of the core member 22 and outer skin 26 at the end thereof to form a generally "L" shaped configuration defining a channel 36. The attachment portion 34 is extruded from a hard polymeric material such as EPDM or PVC having a shore hardness of 50D. At least one retaining member 38 extends into the channel 36. The retaining member 38 is extruded from a soft polymeric material such as EPDM or PVC having a shore hardness of 65A.

The weather seal 12 also includes a separate trim or sealing lip 40 having a generally arcuate shape which is adapted to be removably secured or attached to the weather seal 12 to close or seal the gap 20 when the weather seal 12 is installed onto the flange 19. The trim lip 40 is extruded from a soft polymeric material such as EPDM or PVC having a shore hardness of 65A. The trim lip 40 has a base portion 42 at one end. The base portion 42 has a male projection 44 extending outwardly and is adapted to be received within the channel 36. The male projection 44 is extruded from a hard polymeric material such as EPDM or PVC having a shore hardness of 50D. The male projection 44 is generally rectangular in cross section and has an arcuate recess 46 adapted to conform and engage an arcuate or rounded corner 48 of the outer skin 26. The retaining member 38 grips or couples with the male projection 44 to retain the trim lip 40 to the weather seal 12.

The base portion 42 also has a primary lip 49 and a secondary lip 50 extending outwardly and adapted to engage an outer surface 52 of the attachment portion 34 to prevent contaminants from entering the channel 36. The secondary lip 50 is generally arcuate and forms a recess 54 to receive an end 56 of the attachment portion 34. The trim lip 40 may be coextruded with the outer skin 26 and is removably or detachably secured to the weather seal 12 by the coupling or engagement of the male projection 44 and retaining member 38.

In operation, the weather seal 12 may be installed on the flange 19 after the inner panel member 17 is secured in place on the vehicle 10. The flange 19 is disposed in the channel 24 of the weather seal 12 and the retaining members 28 and 30 grip the flange 19 to secure the weather seal 12 to the flange 19. The trim lip 40 may be attached to the weather seal 12 by disposing the male projection 44 in the channel 36 of the attachment portion 34 as illustrated in FIG. 2. When this occurs, the retaining member 38 grips or couples with the male projection 44 to retain the trim lip 40 to the weather seal 12. As a result, the trim lip 40 is removably or detachably secured to the weather seal 12. The trim lip 40 covers or closes the gap 20 and rests or contacts the inner panel member 17. Accordingly, the present invention provides a simple and inexpensive method of correctly positioning the trim lip 40 to cover or close the gap 20 between the flange 19 and inner panel member 17.

The present invention has been described in an illustrative manner. It is to be understood that the terminology which has been used is in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A weather seal adapted to be secured on a flange of a vehicle to seal a gap defined by an end of the flange and a panel member which is fixedly disposed relative to said flange, comprising:

a core member configured to define a first channel;

an outer skin disposed about an interior and an exterior of said core member;

a plurality of retaining members extending from said outer skin and into said channel to secure said weather seal to the flange;

an attachment portion integrally formed with said outer skin, said attachment portion forming a second channel generally transverse to said first channel having an end portion extending generally transverse to said first channel;

said attachment portion having at least one second retaining member projecting into said second channel;

an independent trim lip having a base portion, an integrally formed primary lip and an integrally formed secondary lip extending longitudinally in a direction generally opposite said primary lip, and a male projection projecting from said base portion, said secondary lip and said male projection cooperating to define a recess;

said male projection being secured releasably within said second channel by said second retaining member when said sealing lip is removably coupled to said attachment portion such that said primary lip engages a portion of said panel member and said secondary lip engages a portion of said end portion of said attachment portion while said end portion extends into said recess to help secure said end portion within said recess; said trim lip thereby sealing said gap between said flange and said panel member disposed fixedly relative to said flange.

2. The weather seal of claim 1, further comprising a tubular member integrally formed with said outer skin and projecting outwardly therefrom generally transversely of said first channel for sealingly engaging a movable external member.

* * * * *